United States Patent [19]

Backman et al.

[11] Patent Number: 4,710,402

[45] Date of Patent: Dec. 1, 1987

[54] METHOD OF MAKING FILTER PAPER

[76] Inventors: Sune Backman, Yngvevagen 6, Djursholm, S-182 64; Hakan Hakanson, Strakvagen 54, Taby, S-183 40, both of Sweden

[21] Appl. No.: 646,726

[22] Filed: Sep. 4, 1984

[51] Int. Cl.$^4$ ............................................. B05D 5/00
[52] U.S. Cl. .................... 427/244; 156/242; 156/250; 156/289; 210/504; 210/505; 210/506; 210/508; 427/289; 427/370
[58] Field of Search ............ 156/242, 288, 250, 307.7, 156/289; 427/244, 369, 370, 372.2, 391, 395, 289, 439; 210/504, 505, 506, 508

[56] References Cited

U.S. PATENT DOCUMENTS

| | | | |
|---|---|---|---|
| 2,568,144 | 9/1951 | Cremer et al. | 210/504 |
| 2,654,440 | 10/1953 | Robinson | 210/508 |
| 2,773,602 | 12/1956 | Sylvester | 210/166 |
| 3,294,582 | 12/1966 | Suchy | 210/508 |
| 4,161,422 | 7/1979 | Lawson et al. | 427/391 |
| 4,472,229 | 9/1984 | Martin | 156/307.7 |

FOREIGN PATENT DOCUMENTS 17985 2/1976 Japan.
226274 12/1924 United Kingdom.

*Primary Examiner*—Caleb Weston
*Attorney, Agent, or Firm*—Seidel, Gonda, Goldhammer & Abbott

[57] ABSTRACT

A flat annular disc filter paper has a plurality of randomly oriented fibers at its surface. The paper is impregnated with a phenolic resin so as to resist compression of the disc and swelling of the paper. The filter paper is made by soaking the paper in the resin, heating the paper and resin so as to burn and melt the resin into close contact with the paper and rolling the filter paper at a temperature above ambient temperature.

14 Claims, No Drawings

METHOD OF MAKING FILTER PAPER

BACKGROUND OF THE INVENTION

The present invention is directed towards filter paper and a method of making the same. The filter paper is comprised of a flat annular disc of paper which is impregnated with a phenolic resin. Additionally, a method is set forth explaining the process of making the impregnated filter paper.

The filter paper when stacked is suitable for use in filter devices such as set out in U.S. Pat. No. 2,773,602. This particular type of filter is called a "mechanical or edge filter". An edge filter utilizes a plurality of concentric flat annular discs stacked one upon another and supported by a tube which engages the inner annular ring of the disc. Between the discs is a small space or interstice. The internal tube is porous such that a fluid may permeate through the wall into the inner cavity of the tube. The edge filter operates by introducing the liquid material to be filtered to the area outside of the stack of annular discs. The liquid is then forced between the interstices of the stacked discs where particles are mechanically blocked in the interstices. Additionally, particles which would normally pass through the interstices may be captured on the plane surfaces of the discs. The filtered liquid may then penetrate the internal tube and be removed from the filter device through the cavity in the tube.

The performance of a filter is determined by the filter's ability to remove particles from the liquid and the flow rate of material through the filter.

Particle removal ability can be further viewed as (a) the filter's ability to remove all suspended solids from the liquid, and (b) the filter's ability to remove suspended solids of a particular particle size. Of special concern in the area of edge filter, is the filter's ability to remove suspended solids of a size which would normally pass through the interstice. To accomplish the capture of those solid particles which would pass through the interstice, a disc with a coarse surface may be used.

The flow rate through the filter device depends upon the pressure drop across the filter. Across the filter meaning from outside of the annular discs to the inside cavity of the tube. Increased pressure drop due to fouling of the interstices and swelling of the paper, causes reduced flow through the filter. Three primary causes of increased pressure are (a) fouling of the interstices with filtered particles, (b) swelling of the filter paper due to absorption of the filtered liquid into the paper, and (c) reduction of the size of the interstices due to compression of the annular discs by the compressive forces from the surrounding liquid. Thus, to maintain the flow through the filter it is imperative to minimize the increase in pressure drop across the filter caused by swelling and compression of the interstices.

Filter discs used in prior art edge filters, as described above, are made of metal, plastic, paper or fibrous material. Metal or plastic edge filters are able to withstand the compressive force exerted by the surrounding liquid thus reducing increased pressure drop due to compression of the discs. But the surfaces of the metal discs are smooth, thus unable to capture particles too small to be blocked by the interstices. Thus, effectiveness of removability is reduced because no coarse surface is provided to catch small particles.

Edge filters made of paper or fibrous material are able to entrap particles too small to be blocked in the interstices. This is due to the coarse surfaces on the plane portions of the discs. But paper or fibrous material is unable to withstand the compressive force of the liquid. The compression due to the surrounding liquid will cause the interstices to close.

Paper and fibrous materials have the ability to absorb the liquid. Absorption of the liquid causes fibers to swell. The swelling adversely affects filter operation by causing the interstices to close and reducing the ability to entrap small particles on the plane surfaces of discs.

SUMMARY OF THE INVENTION

The present invention solves the above problems by the use of the filter paper which is impregnated with a phenolic resin. The impregnated filter paper has enhanced qualities. The resin totally encapsulates the individual paper fibers thus creating an impervious layer, consequently reducing swelling due to absorption of the liquid by the paper. Yet, the coarseness of the plane surfaces of the disc remain intact, thus allowing capture of small particles. Additionally, the resin binds the paper in a rigid form thus giving the paper additional mechanical strength to resist compression due to the pressure of the surrounding liquids. The result is a filter material which has a longer usable life due to the reduction of the swelling of the filter paper and resistance to compression of the filter paper.

A further advantage of the impregnated paper filter material is that the randomly arranged fibers of the paper create an irregular surface pattern able to adapt to adhere or even catch the smallest of particles. Materials with smooth surfaces, such as plastic or metal, do not have the same ability to entrap small particles; because plastic or metal do not have the same irregular surface that the impregnated paper filters have.

The present invention is directed towards a filter paper and a method of making the same. The filter paper comprises a paper being of a flat annular disc shape and having a plurality of randomly distributed fibers which create an irregular plane surface for catching small particles. The paper is impregnated with a phenolic resin which saturates the paper and gives the paper a rigid quality so to resist compression by surrounding liquids. Additionally, the phenolic resin enhances the paper filter by reducing absorption of the liquid into the paper, thus reducing swelling.

The method for making the filter paper comprises the steps of; soaking the filter paper in liquified phenolic resin until the paper is saturated; punching the annular discs from the sheet of filter paper after the paper is saturated; applying heat and a low pressure to the saturated paper so that the resin hardens in close contact with the paper; reducing the pressure applied to the paper at or just before hardening and separating the paper by means of an air stream, to prevent the discs from adhering or attaching to one another; rolling the paper under pressure to flatten and even both surfaces of the paper.

For the purpose of illustrating the invention, there is discussed a form which is presently preferred; it being understood, however, that this invention is not limited to the precise arrangements and instrumentalities discussed.

DESCRIPTION OF THE INVENTION

The filter paper is in the shape of a flat annular disc. The individual discs may be stacked on top of one another with an interstice between them. The stacked discs are engaged at their inner annular ring by a porous tube. The irregular plane surface of the individual discs, which is created by the randomly orientated paper fibers, creates additional surface area so to catch small particles which would not be blocked by the interstice space between the individual discs. A compressive force may be exerted axially upon the discs so to regulate or control the interstitial space between the individual discs.

The method for making the discs begins with a sheet of commercially available 82 gram filter paper. This paper is soaked in a phenolic resin, such as formalin. The paper is soaked until the phenolic resin has saturated the paper.

The paper sheet is then punched to form the flat annular filter discs. The discs must be punched from the sheet prior to setting the phenolic resin. This sequence must be followed because once the phenolic resin has hardened upon the paper, the paper becomes too brittle for the stamping process.

The phenolic soaked discs are then heated so as to burn and melt the resin in close contact with the paper fibers. The optimum temperature at which this heating should occur is about 130° C. The heating, at the prescribed temperature, should last for approximately 2 hours and 10 minutes. While the heating of the discs occurs, it is best to compress the discs just above atmospheric pressure.

When hardening of the resin occurs or immediately prior to hardening, the discs may have a tendency to stick together. Therefore, the pressure should be reduced and the discs separated with the aid of an air stream. This prevents the discs from adhering or sticking together.

The discs should then be placed on a planed or plane ground smooth plate which is preheated to a temperature of about 100° C. The reason for the raised plate temperature is that the discs would otherwise break upon being rolled. Once on this smooth plate, the discs are rolled by a smooth roller at a pressure of about 250 kg per square centimeter. The object of the rolling is to keep the discs flat and even. The plate may be equipped with a feeding device making it possible to automate the manufacture of the discs.

When making filter paper for use with fluids under high pressure the operating parameters of the process must be altered. The temperature at which burning and melting of the resin occurs should be between about 150° to about 200° C. The time and pressure aspects of the heating step remain the same. The disc separation at hardening remains the same also. The rolling pressure should be elevated to between about 750 and about 1000 kg per square centimeter, but the plate temperature of about 100° centigrade should remain the same.

The resulting surface fineness should allow filtration of particles in the 3 to 4 micron range.

The present invention may be embodied in other specific forms without departing from the spirit or essential attributes thereof and, accordingly, reference should be made to the appended claims, rather than to the foregoing specification, as indicating the scope of the invention.

I claim:

1. A method for making filter paper for use in an edge-filtering system, comprising the steps of:
   (a) soaking a filter paper in a liquified phenolic resin until the paper is saturated, said filter paper being a sheet;
   (b) punching annular disks from said saturated sheet;
   (c) applying heat and low pressure to said annular disks from said saturated sheet of filter paper, so that the resin hardens in close contact with the paper and its constituent fibers; and
   (d) reducing the pressure applied to the annular disks at or just before hardening of the resins.

2. The method as described in claim 1 for mating filler paper used in high pressure applications wherein the resin in heated at a temperature of between about 150° and about 200° centigrade.

3. The method as described in claim 1 wherein the paper, when in contact with other paper, is separated by an air stream at or before hardening of the resin to deter the paper from adhering to the other paper.

4. The method as described in claim 1 wherein the paper is rolled under pressure after the resin has hardened.

5. The method as described in claim 4 wherein a rolling pressure of about 250 kg per square centimeter is applied to the paper.

6. The method as described in claim 4 for making filter paper used in high pressure applications wherein a rolling pressure between about 750 and 1000 kg per square centimeter is applied to the paper.

7. The method as described in claim 4 wherein the paper is rolled on a surface having a temperature above ambient temperature.

8. The method as described in claim 4 wherein the paper is rolled on a surface having a temperature of about 100° C.

9. The method as described in claim 1 wherein the the resin is heated to a temperature of about 130° centigrade.

10. The method as described in claim 1 wherein the the resin is heated over a time period of about 2 hours and 10 minutes.

11. The method as described in claim 1 wherein the phenolic resin is formalin.

12. The method of claim 1 wherein the filter paper is characterized by an irregular surface containing a multiplicity of paper fibers randomly distributed both on the surface of the paper and internally thereof.

13. The method of claim 12 wherein the filter paper is paper of 82 gram weight.

14. The method of claim 12 wherein the filter paper has a surface fineness of a gradation sufficient to allow filtration of particles in the 3–4 micron range.

* * * * *